(12) United States Patent
Wang (10) Patent No.: US 8,181,997 B2
(45) Date of Patent: May 22, 2012

(54) WATER HOSE CONNECTOR

(76) Inventor: Hsin-Fa Wang, Chang Hua Hsien (TW)

( * ) Notice: Subject to any disclaimer, the term of this patent is extended or adjusted under 35 U.S.C. 154(b) by 419 days.

(21) Appl. No.: 12/471,181

(22) Filed: May 22, 2009

(65) Prior Publication Data

US 2010/0295292 A1 Nov. 25, 2010

(51) Int. Cl.
*F16L 37/18* (2006.01)
(52) U.S. Cl. ............ 285/314; 285/24; 285/86; 285/305; 285/319; 285/394
(58) Field of Classification Search .................. 285/24, 285/27–29, 85–86, 239, 257, 305, 308, 314, 285/319, 394, 417
See application file for complete search history.

(56) References Cited

U.S. PATENT DOCUMENTS

| 4,660,803 | A * | 4/1987 | Johnston et al. | 251/149.1 |
| 6,199,913 | B1 * | 3/2001 | Wang | 285/24 |
| 6,467,816 | B1 * | 10/2002 | Huang | 285/316 |
| 2007/0275590 | A1 * | 11/2007 | Cheng | 439/404 |

* cited by examiner

*Primary Examiner* — Aaron Dunwoody
*Assistant Examiner* — Fannie Kee
(74) *Attorney, Agent, or Firm* — Egbert Law Offices PLLC (57) ABSTRACT

A water hose connector assembly has a main body, an elastic snapper seat, a sleeve and a pipe locking ring. A plurality of oblique guide blocks are formed on a tubular portion of the main body. The oblique guide blocks have an oblique guide surface. An elastic snapper seat has a C-shaped chassis and a plurality of elastic claws. The chassis is received in slots at a bottom of the oblique guide blocks. Elastic pushers are formed onto an inner wall of the sleeve and aligned with the oblique guide blocks.

2 Claims, 8 Drawing Sheets

WATER HOSE CONNECTOR

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a water spraying tool, and more particularly to an innovative structure of a water hose connector.

2. Description of Related Art Including Information Disclosed Under 37 CFR 1.97 and 37 CFR 1.98.

The water hose connector is generally applied to gardening or water spraying as a connection fitting for water sprayers and water hoses, or only for water hoses.

The water hose connector is structurally formed in such a way to facilitate the assembly, positioning and release, so the structural formation is of paramount significance.

Generally, the assembly, positioning and release of a typical water hose connector are realized through axial displacement of a sleeve set, namely, if force is applied to the sleeve, it will shift back to drive the opening of the preset claw and then release the male connector on the water hose end. Otherwise, if no force is applied to the sleeve, the sleeve can be reset automatically via a flexible resetting mechanism, thus realizing rapid assembly and release.

The flexible resetting mechanism is available with multiple compact patterns that can be used in space-saving applications. Therefore, the technical problem is how to form the most compact flexible resetting mechanism featuring strong operational stability and an excellent positioning effect.

Thus, to overcome the aforementioned problems of the prior art, it would be an advancement in the art to provide an improved structure that can significantly improve efficacy.

Therefore, the inventor has provided the present invention of practicability after deliberate design and evaluation based on years of experience in the production, development and design of related products.

BRIEF SUMMARY OF THE INVENTION

The present invention is characterized by oblique guide blocks being prefabricated onto the reducing flanged tube of the main body. The elastic pusher is prefabricated onto an inner wall of the sleeve. The elastic snapper seat is provided with a C-shaped chassis that is locked securely onto the snapped limit portion at the bottom of the oblique guide block. With these unique elements, the oblique guide blocks, which are prefabricated onto the main body, have an extremely stable guiding effect and state that can be realized. As the oblique guide blocks are prefabricated onto the main body, and the elastic pusher is prefabricated onto inner wall of the sleeve, the flexible resetting mechanism of the sleeve features simple construction and a lower manufacturing cost without additional fittings. The C-shaped chassis of the elastic snapper seat can be transversely assembled into the reducing flanged tube of the main body for stable positioning via the snapped limit portion, helping to realize efficient assembly and a satisfactory positioning effect. Thus, the water hose connector of the present invention presents simple construction, convenient assembly and stable guiding with improved applicability and better industrial efficiency.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

FIGS. 1-4 depict preferred embodiments of a water hose connector of the present invention. The embodiments are provided for only explanatory purposes.

The water hose connector A comprises a main body 10, at the bottom of which there is a male threaded portion 11 and several teeth 12. A reducing flanged tube 13 is formed at top of the main body 10. A flanged ring 14 is shaped at bottom of the reducing flanged tube 13. Several radial through-holes 15 are arranged at intervals on the top of the reducing flanged tube 13, and a axial water bore 16 is placed at center of the main body 10.

The present invention includes several oblique guide blocks 20 prefabricated onto the reducing flanged tube 13 of the main body 10. The oblique guide blocks 20 are protruded radially out of the reducing flanged tube 13 and provided with an oblique guide surface 21. The bottom of the oblique guide block 20 is connected with the flanged ring 14 of the reducing flanged tube 13.

There are several snapped limit portions 30, formed transversely inwards at the bottom of the oblique guide blocks 20.

The present invention also includes an elastic snapper seat 40, containing a C-shaped chassis 41 and several elastic claws 42 arranged at intervals on C-shaped chassis 41. Every elastic claw 42 contains a fixture block 421, a dodging portion 422 and a support 423 from top to down. The C-shaped chassis 41 is abutted on the flanged ring 14 of the reducing flanged tube 13 and locked securely onto the snapped limit portion 30 at the bottom of the oblique guide block 20. The fixture block 421 of the elastic claw 42 is separately aligned with and protrudes into the radial through-hole 15 of the reducing flanged tube 13. So, the fixture block 421 is used for locking and positioning of the male water joint 80 that is inserted into the axial water bore 16 of the main body 10 (referring to FIG. 6).

A sleeve 50 is sleeved externally onto the reducing flanged tube 13 of the main body 10 and the elastic snapper seat 40. A pressing flange 52 on the top of the inner wall 51 of the sleeve 50 is aligned with the elastic claws 42 of the elastic snapper seat 40.

Several elastic pushers 60 are prefabricated onto inner wall 51 of the sleeve 50. A gap W (marked in FIG. 4) is formed between the elastic pusher 60 and inner wall 51 of the sleeve 50, and the elastic pusher 60 is abutted onto the oblique guide surface 21 of oblique guide block 20 set for the reducing flanged tube 13 of the main body 10. In such a case, the sleeve 50 is flexibly supported and pressed to move downwards to a preset stroke.

The present invention includes a pipe locking ring 70, at inner side of which a female threaded portion 71 is screwed onto the male threaded portion 11 at the bottom of the main body 10. Moreover, a pyramidal locking surface 72 is arranged at an inner bottom of the pipe locking ring 70. The pipe locking ring 70 is used to lock securely the water hose assembled into the teeth 12 at the bottom of the main body 10. In such a case, the pyramidal locking surface 72 will gradually press the teeth 12 into a recessed state, thereby pressing the water hose.

The C-shaped chassis 41 and elastic claws 42 of elastic snapper seat 40 are prefabricated from plastic materials.

Figure 1:
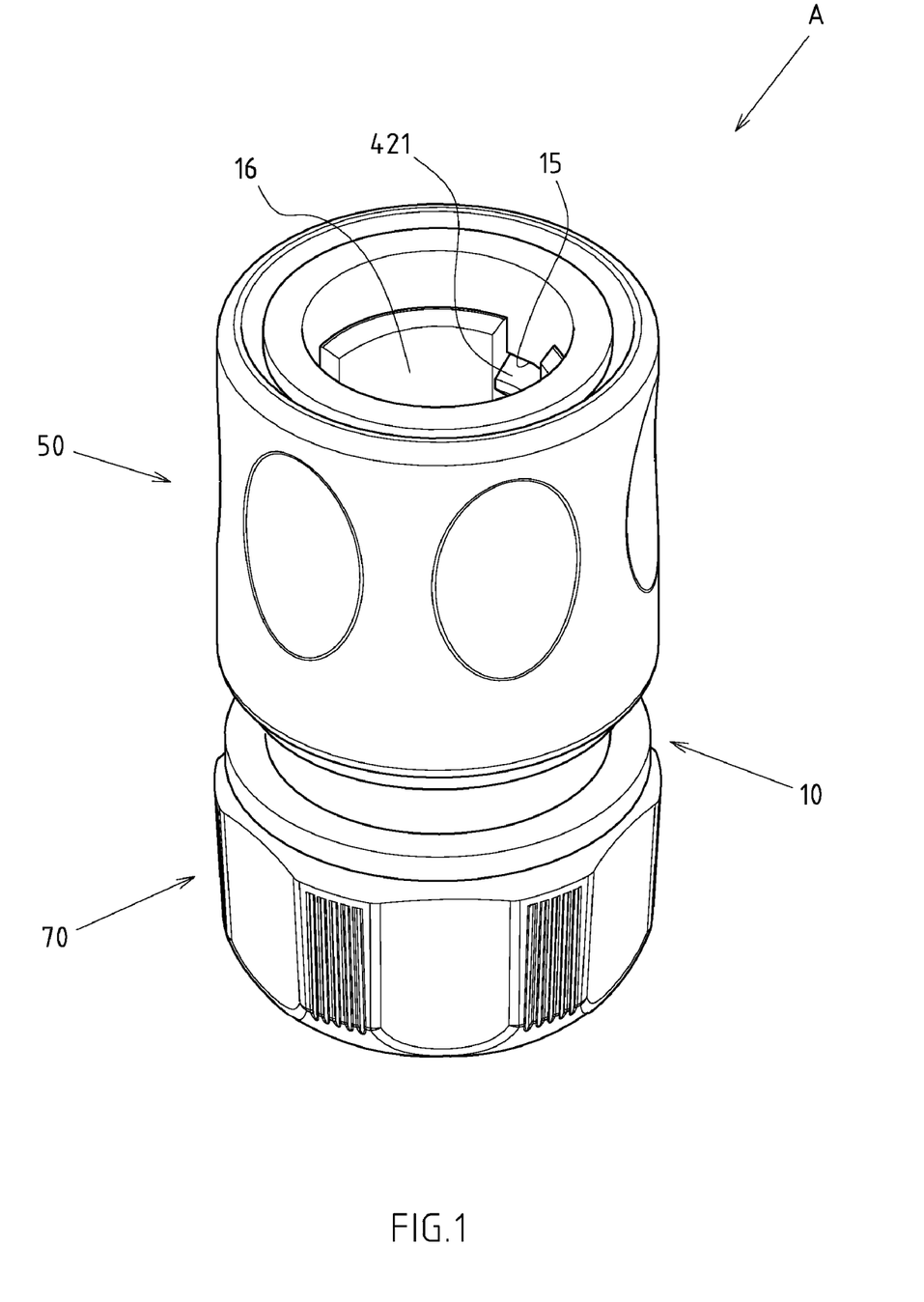
FIG. 1 shows an assembled perspective view of the preferred embodiment of the present invention.
Figure 2:
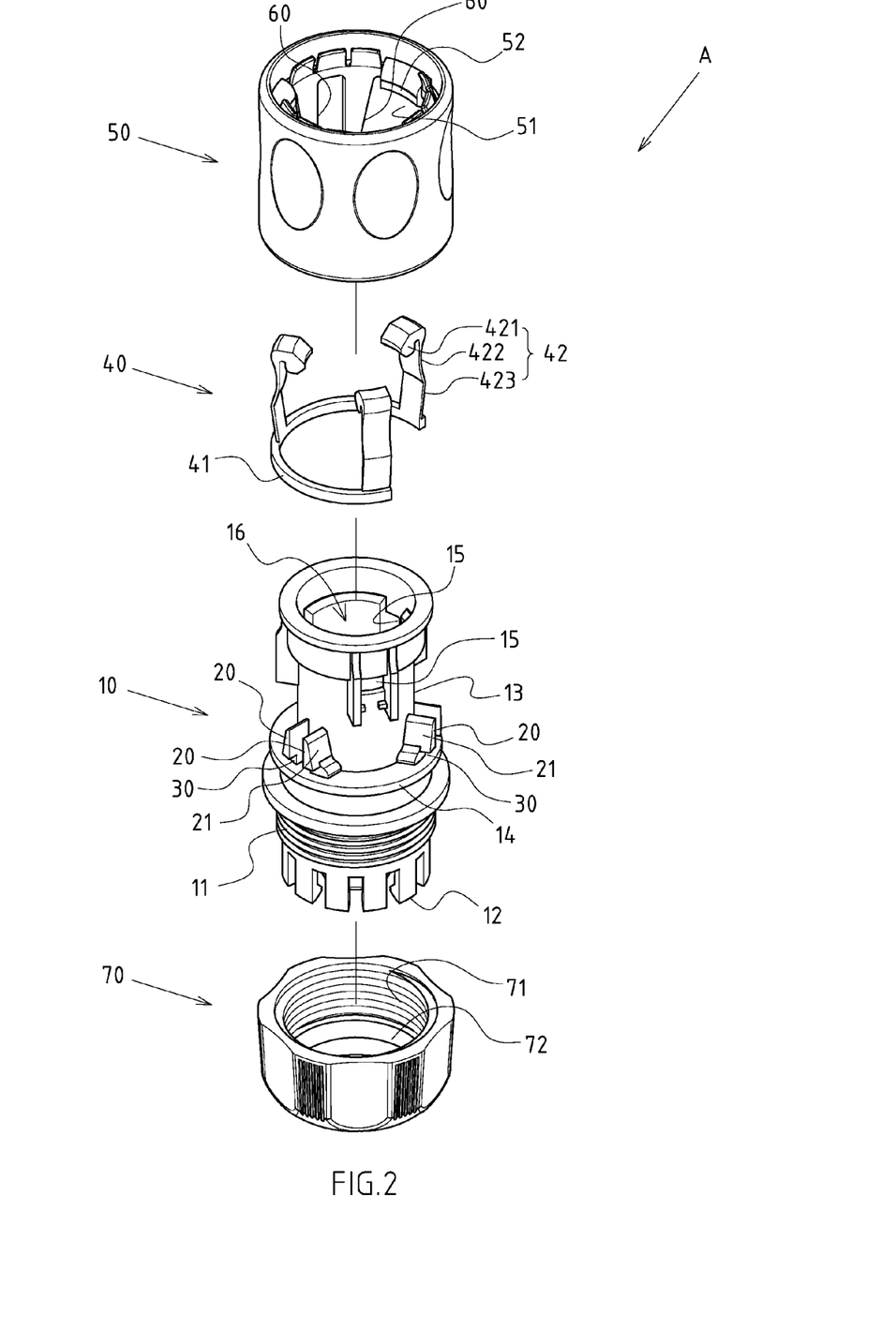
FIG. 2 shows an exploded perspective view of the preferred embodiment of the present invention.
Figure 3:
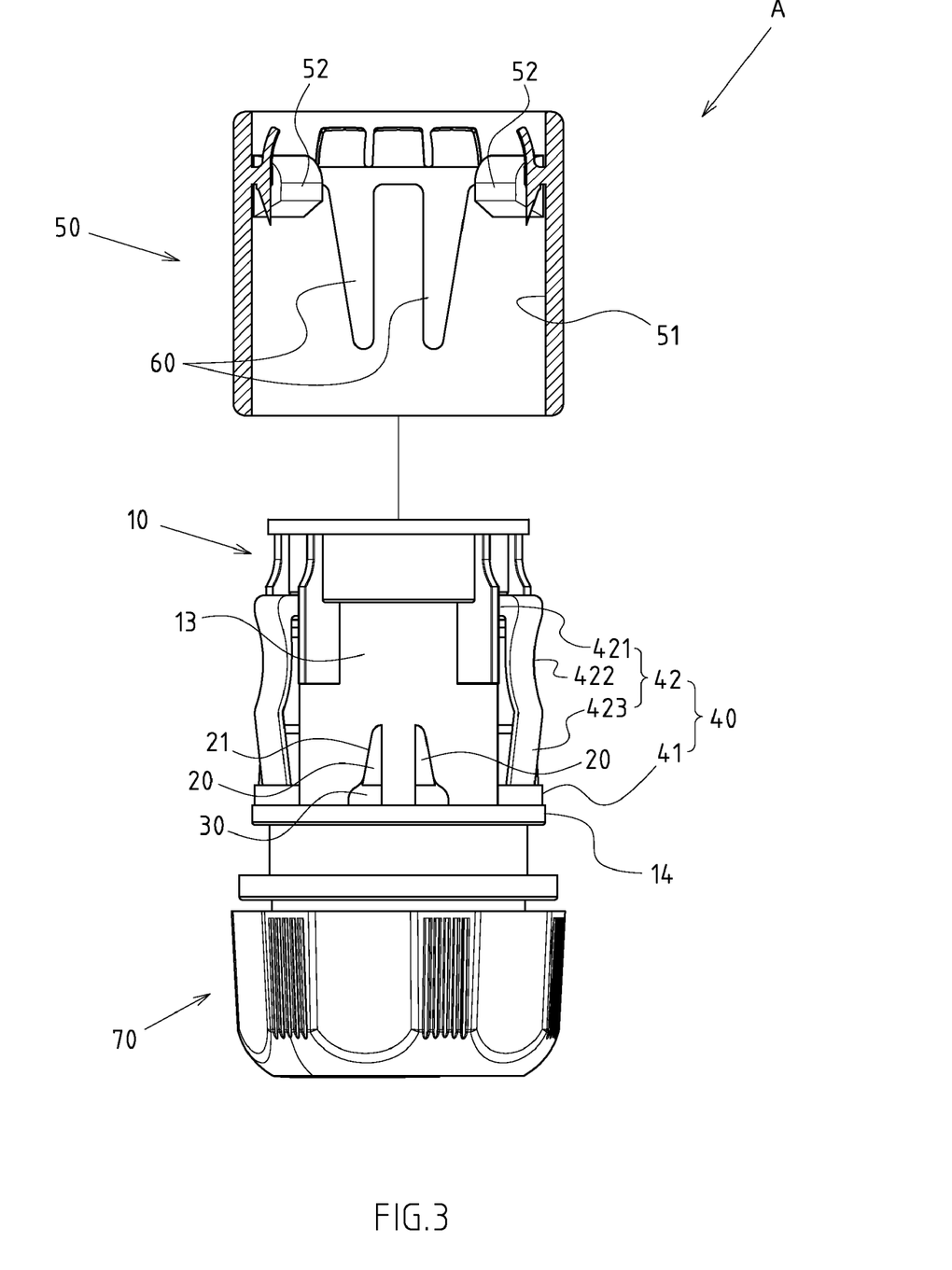
FIG. 3 shows a partially exploded sectional view of the preferred embodiment of the present invention.
Figure 4:
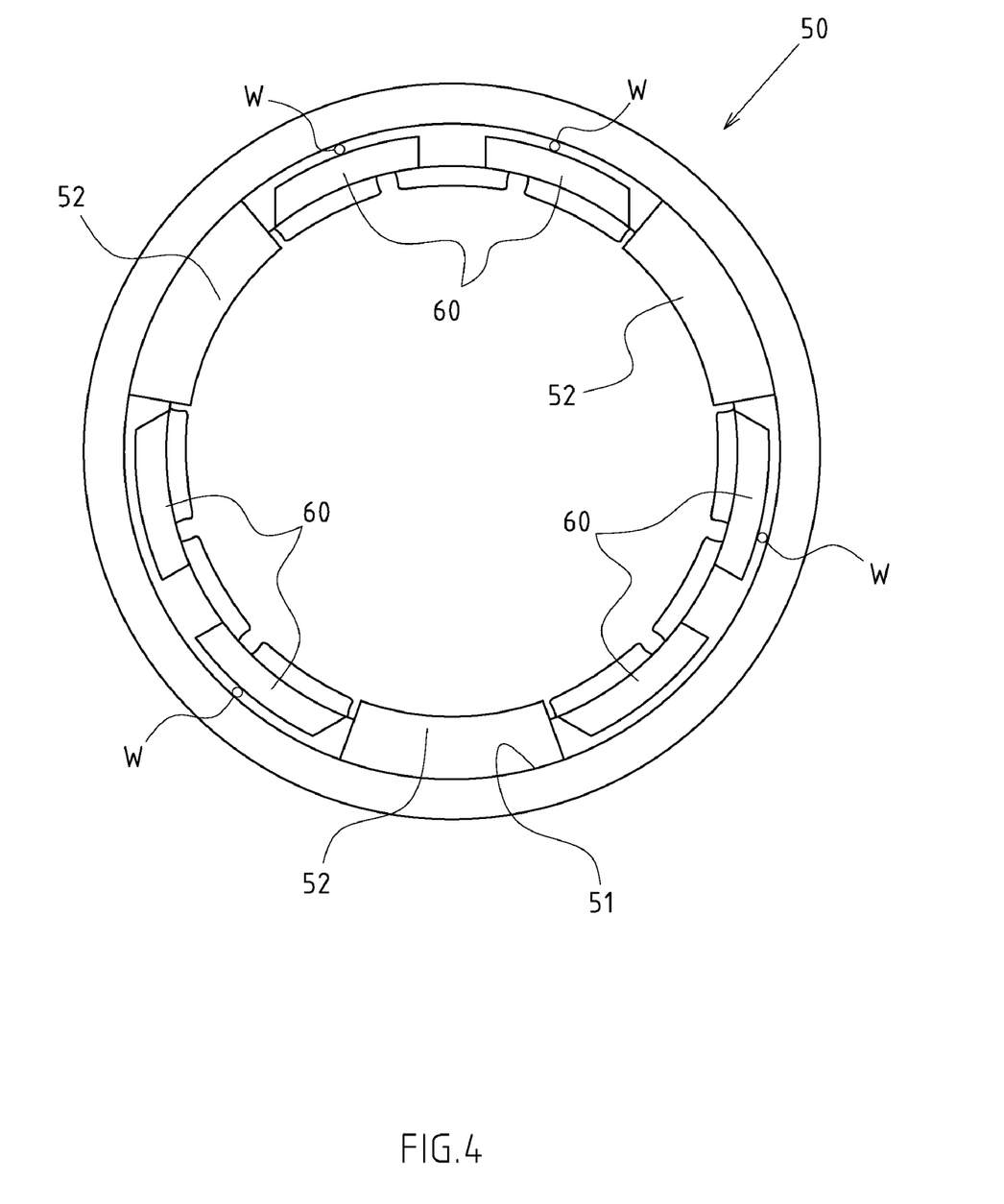
FIG. 4 shows a top plan view of the sleeve of the present invention.

Referring to FIGS. 2-3, the oblique guide surfaces 21 of nearby oblique guide blocks 20 for the reducing flanged tube 13 of the main body 10 are arranged symmetrically, such that the elastic pushers 60 on the inner wall 51 of the sleeve 50 are also designed symmetrically.

Based upon above-specified structures, the present invention is operated as follows:

First, referring to FIG. 2, the existing male waterjoint 80 is locked and positioned in such a manner that the elastic claw 42 of the elastic snapper seat 40 allows a dodging portion 422 to be arranged below the fixture block 421, and a pressing flange 52 is set on the top of the inner wall 51 of the sleeve 50. So, when the sleeve 50 is not under a descending state, the exterior of the fixture block 421 of the elastic claw 42 is abutted by the pressing flange 52, such that the fixture block 421 cannot be flared so as to lock securely the male waterjoint 80, with the pattern of the male waterjoint 80 shown in FIG. 6. When the sleeve 50 moves down under the applied forced, the pressing flange 52 will shift downwards correspondingly to the dodging portion 422 below the fixture block 421. In such a case, the fixture block 421 can be flared flexibly so that the male waterjoint 80 can be released and removed by the user.

Figure 5:
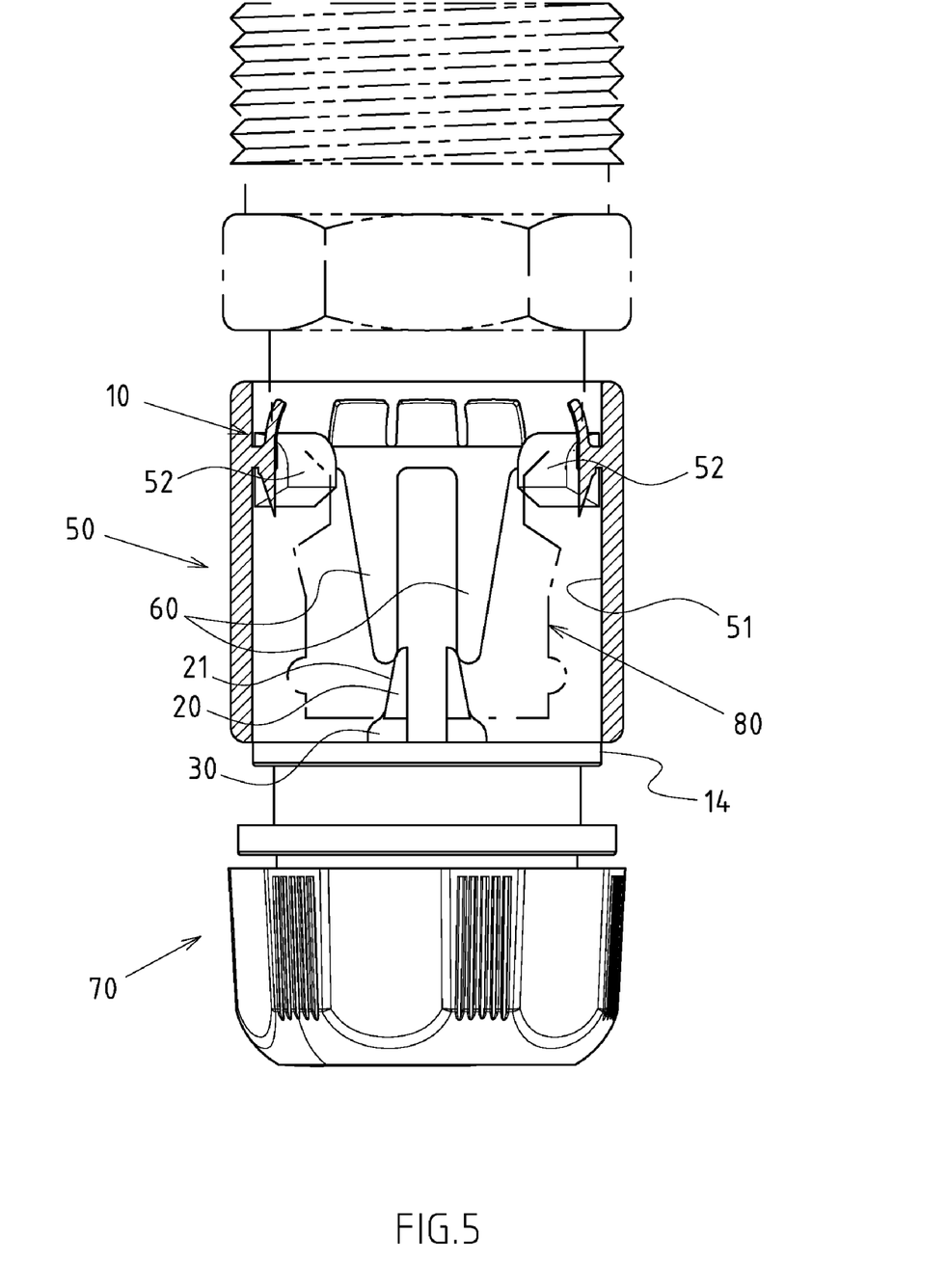
FIG. 5 shows a perspective view of the present invention where the elastic pusher and oblique guide block are not yet abutted.
Figure 6:
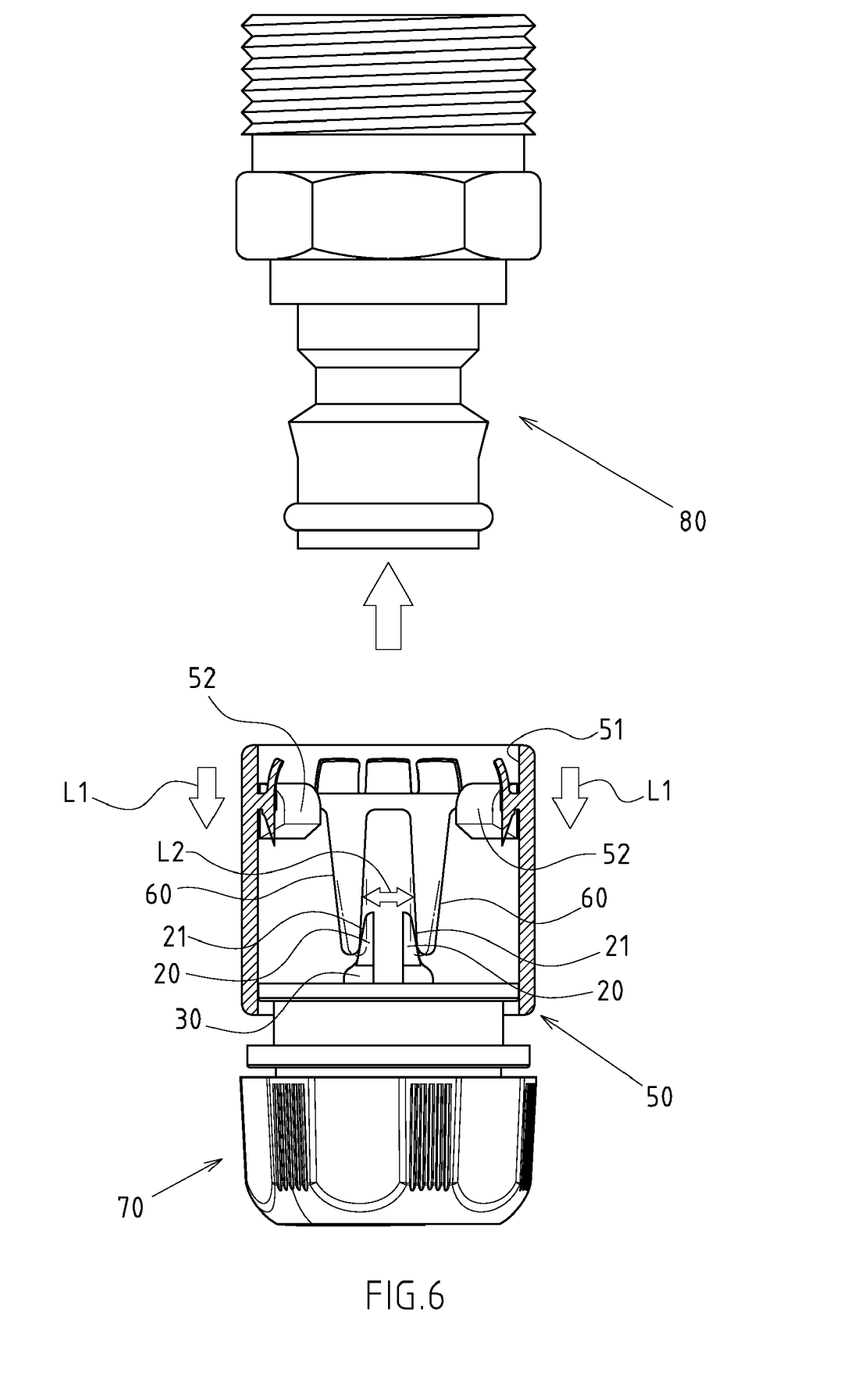
FIG. 6 shows a perspective view of the present invention where the elastic pusher and oblique guide block are abutted.

Referring to FIG. 5 for the flexible resetting mechanism of the sleeve 50, when the sleeve 50 is not under a descending state, the elastic pusher 60 of the sleeve 50 is abutted onto the oblique guide surface 21 of oblique guide block 20 set for the reducing flanged tube 13 of the main body 10, so the sleeve 50 is flexibly supported and pressed to move downwards to a preset stroke. Referring also to FIG. 6, when the sleeve 50 moves down under the applied forced (marked by arrow L1), the elastic pusher 60 will generate a deflection (marked by arrow L2) under the action of the oblique guide surface 21 of the oblique guide block 20, and then accumulate the resetting force. So, the sleeve 50 will ascend with the resetting of the elastic pusher 60 when the applied force is removed. Additionally, the elastic snapper seat 40 is removed to clearly indicate the interaction between the oblique guide block 20 and elastic pusher 60 in FIGS. 5 and 6.

Figure 7:
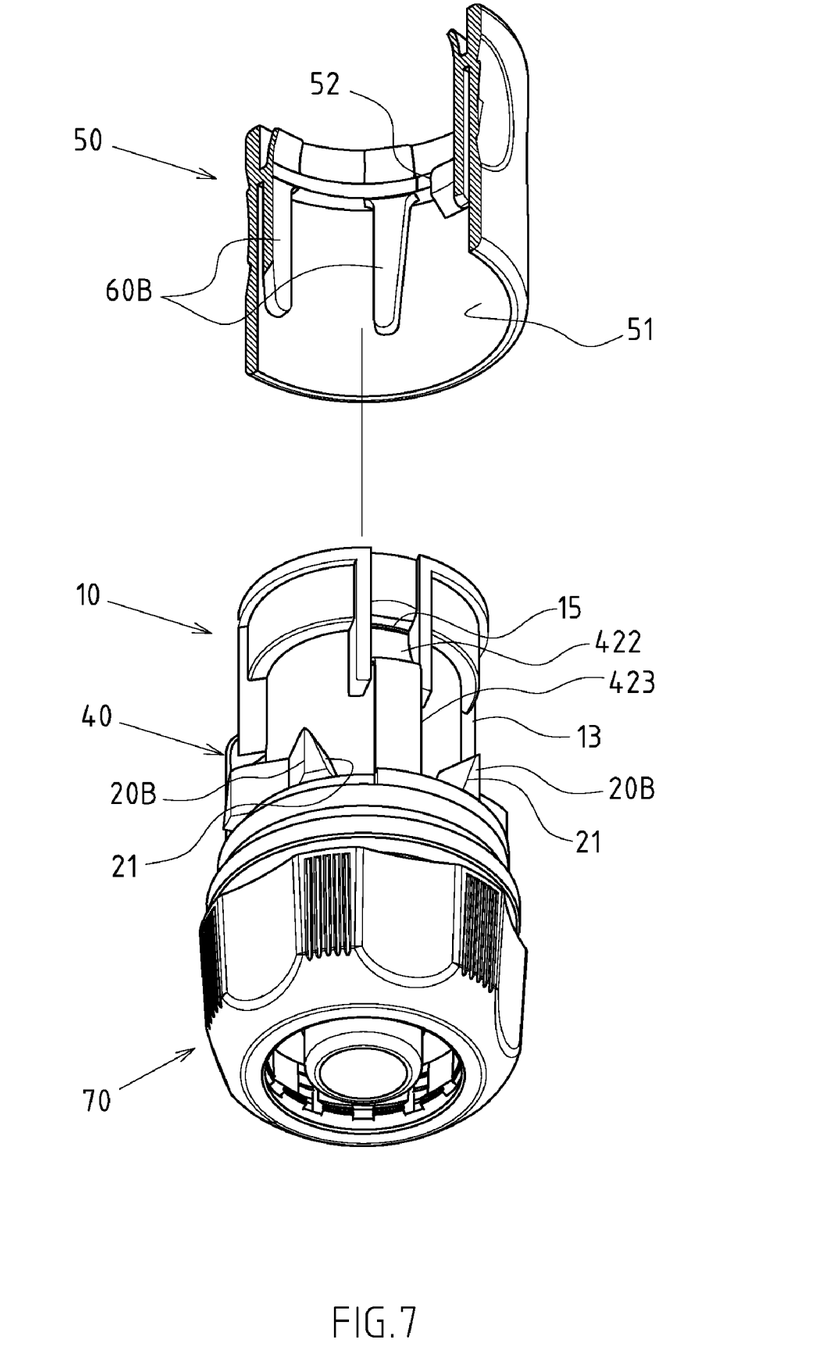
FIG. 7 shows a perspective view of another preferred embodiment of the oblique guide block and elastic pusher of the present invention.
Figure 8:
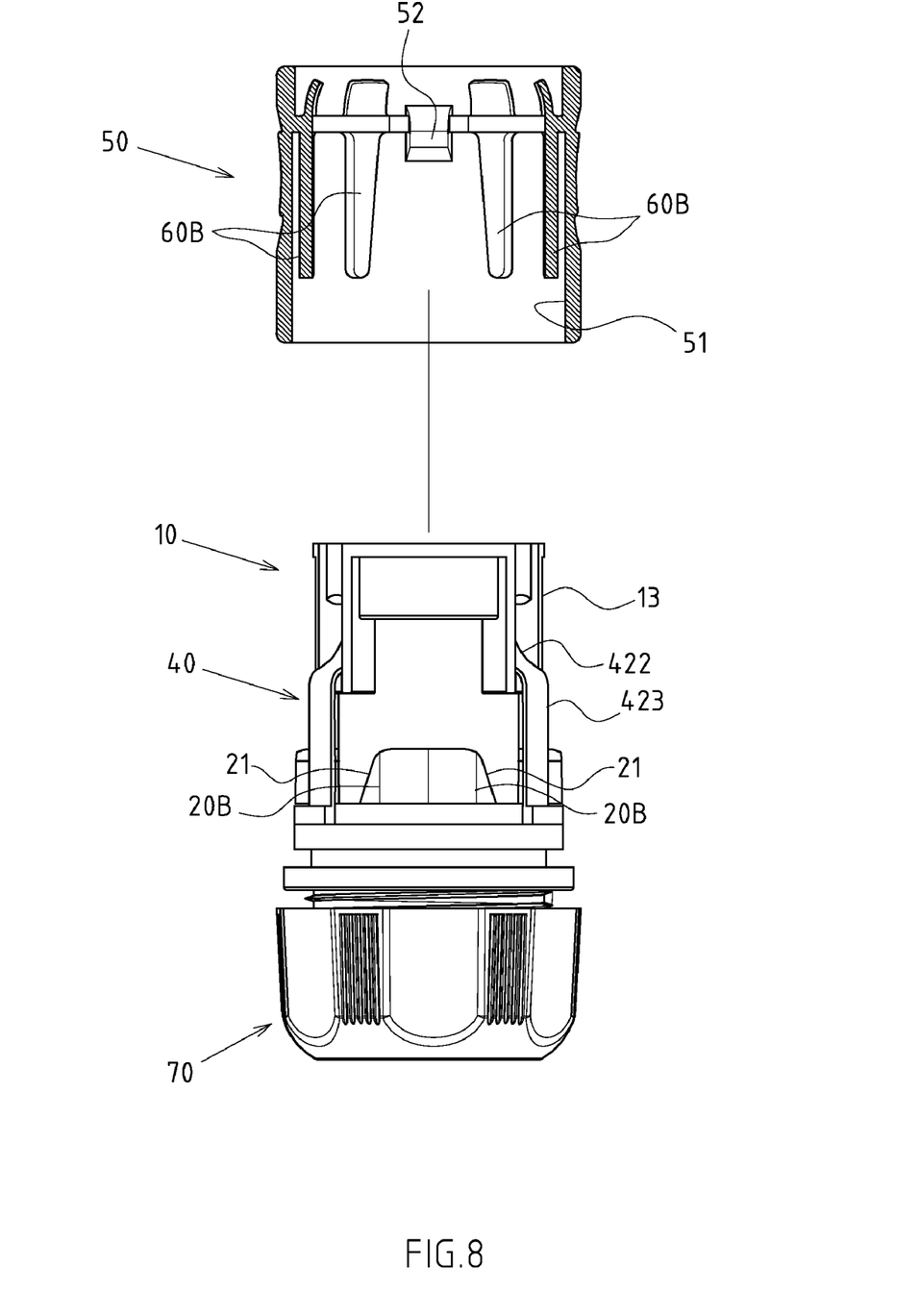
FIG. 8 shows a partial sectional and elevation view of another preferred embodiment of the oblique guide block and elastic pusher of the present invention.

Referring also to FIGS. 7 and 8, there is another application view of the oblique guide block 20B and elastic pusher 60B, wherein the elastic pushers 60B of the preferred embodiment are pyramidal patterns at intervals, and the oblique guide blocks 20B are interconnected. The oblique guide surfaces 21 are arranged symmetrically.

I claim:

1. A water hose connector assembly comprising:
a main body having a male threaded portion and a plurality of teeth at an end thereof, said main body having a tubular portion formed at an opposite end thereof, said tubular portion having a diameter less than a diameter of said male threaded portion, said tubular portion having a flange formed at one end thereof and extending radially outwardly therearound, said tubular portion having a plurality of through-holes in spaced relation at an opposite end thereof, said main body having a bore extending from the end to the opposite end therethrough;
a plurality of oblique guide blocks formed on said tubular portion, said plurality of oblique guide blocks protruding radially outwardly of said tubular portion, each of said plurality of oblique guide blocks having an oblique guide surface, said plurality of oblique guide blocks being connected with said flange;
a plurality of slots formed between the plurality of oblique guide blocks and the flange of the tubular portion;
an elastic snapper seat having a C-shaped chassis and a plurality of elastic claws extending in spaced relation to each other radially outwardly of said C-shaped chassis, each of said plurality of elastic claws having a fixture block and a dodging portion and a support, said C-shaped chassis abutting said flange and locked into said plurality of slots, the fixture blocks aligned with and protruding into said plurality of through-holes respectively;
a sleeve positioned externally on said tubular portion and over said elastic snapper seat, said sleeve having a plurality of pressing flanges on an end of an inner wall, said plurality of pressing flanges being aligned with said plurality of elastic claws;
a plurality of elastic pushers formed on said inner wall of said sleeve, said plurality of elastic pushers defining a gap with said inner wall of said sleeve, the plurality of elastic pushers abutting said oblique guide surfaces; and
a pipe locking ring having a female threaded portion threadedly engaged with said male threaded portion of said main body,
wherein when the sleeve is moved toward the flange under an applied force, the plurality of pressing flanges will shift to the dodging portion below the fixture block such that the fixture block can be flared flexibly to release and remove an inserted male member.

2. The water hose connector assembly of claim 1, said plurality of oblique guide surfaces arranged symmetrically.

* * * * *